C. C. BUTLER.
FERTILIZER DISTRIBUTER.
APPLICATION FILED JULY 16, 1909.

955,133.

Patented Apr. 19, 1910.

WITNESSES:
H. B. Buss
Hazle Fredin.

INVENTOR
C. C. Butler.

BY G. C. Kennedy
ATTORNEY

UNITED STATES PATENT OFFICE.

CLINTON C. BUTLER, OF WATERLOO, IOWA, ASSIGNOR TO WILLIAM GALLOWAY COMPANY, OF WATERLOO, IOWA.

FERTILIZER-DISTRIBUTER.

955,133. Specification of Letters Patent. Patented Apr. 19, 1910.

Application filed July 16, 1909. Serial No. 508,058.

*To all whom it may concern:*

Be it known that I, CLINTON C. BUTLER, a citizen of the United States of America, and a resident of Waterloo, Blackhawk county, Iowa, have invented certain new and useful Improvements in Fertilizer-Distributers, of which the following is a specification.

Figure 1:
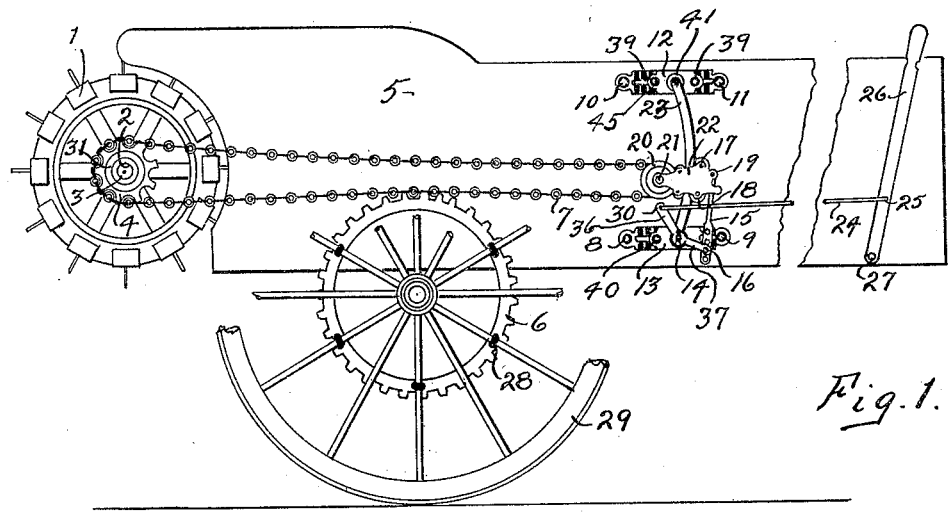
Figure 2:
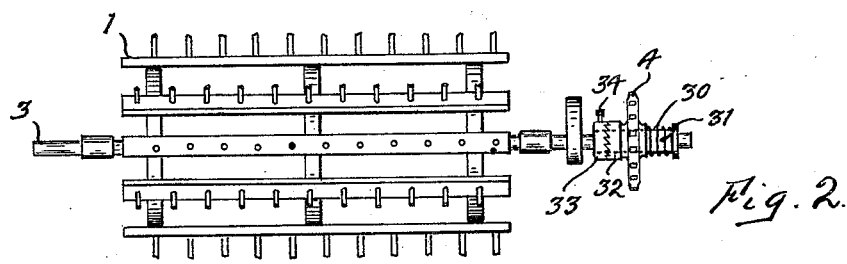
Figure 3:
Figure 4:
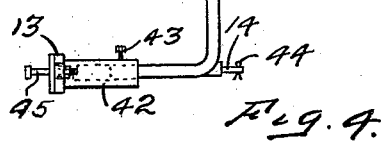

My invention relates to improvements in fertilizer distributers, and the objects of my invention are these, first, to furnish an improved and simplified means for adjusting the position of the driven-sprocket wheel on the distributing-drum shaft laterally, and second, to provide improved means for shifting the driving sprocket-chain out of or into engagement with the driving-sprocket wheel, with means for adjusting the position of the forward end of said chain laterally, and for regulating the tension of the chain to take up slackness therein. These objects I have accomplished by the mechanism which is hereinafter fully described and claimed, and which is illustrated in the accompanying drawings, in which:

Figure 1 is a right-side elevation of the rear part of a fertilizer distributer, showing my improved means for driving the distributing-drum. Fig. 2 is a detail rear elevation of the distributing-drum, its shaft, and the means adopted by me for adjusting the position of the driven-sprocket wheel along said shaft. Fig. 3 is a longitudinal axial central section of that end of the distributing-drum shaft which receives the hollow sleeve on which the adjustable driven-sprocket wheel is mounted. Fig. 4 is a rear elevation of the U-shaped slideway and its means of lateral adjustment in its supporting brackets.

Similar numbers refer to similar parts throughout the several views.

The wagon-box 5 of the fertilizer distributer is supported on carrying-wheels, of which but a broken rear wheel is shown, that to which the driving-sprocket wheel or rim 6 is connected by means of clamps 28. The wheel 29 when rotating under draft causes its connected sprocket-rim 6 to also rotate, the latter driving the sprocket-chain 7 when the latter is lowered into engagement with it by means to be hereinafter described.

The receptacle 5 has at one end a distributing-drum 1 which is mounted upon a rotary shaft 3, the latter supported by bearings projected from said receptacle. The projecting right-hand end of said shaft is longitudinally grooved at 2. A hollow sleeve 31 is slidably fitted upon said shaft and has a projecting annular fillet at its outer end. Said sleeve is also perforated at 35 to receive the set-screw 34, the latter also passing through a registering perforation in a collar 33, the latter mounted upon the inner end of the sleeve, to enter and engage the inner face of the groove 2 in said shaft. A driven-sprocket wheel 4 is rotatably mounted upon said sleeve, and a yieldable tension-spring is coiled about said sleeve between said sprocket-wheel and the annular fillet on the outer end of the sleeve. The left-hand end of the hub of said sprocket-wheel and the right-hand end of said collar have like-shaped mating ratchet dentations, in engagement with each other the result of the tension of the spring 30. The hub 32 is thereby prevented from turning back relative to the collar 33, but may freely move the other way relative thereto. When the set-screw 34 is loosened, the sleeve 31 may be adjusted in position longitudinally along the shaft 3, the end of the screw sliding in the groove 2. The position of the sprocket-wheel 4 may be thereby adjusted laterally along said shaft, to occasion a like lateral adjustment in the rear end of the sprocket-chain 7, when the latter has to be shifted to accommodate it in position to the location of a driving-sprocket wheel 6 when the latter is connected to a carrying-wheel 29 which may be on a different width of tread than the running-gear on which the receptacle may have been theretofore used. The device used for this adjustment is very simple, since but one set-screw is used, while the parts are fewer than in other devices for this purpose.

The forward end of the sprocket-chain 7 is passed about an idler 20, which is pivoted on a pintle 21 in the rear part of a slide-block 22. This slide-block has spaced apart anti-friction rollers 17 and 18 extending along the forward and rear sides of a curved slideway 23, to roll therealong when the slide-block is moved up or down by means presently to be described. A bracket-plate 39 is secured to the upper part of the receptacle 5 by bolts 10 and 11. A like bracket-plate 40 is secured to the lower part of said receptacle under the other bracket-plate by means of bolts 8 and 9. Each of said bracket-plates has a medial longitudinal slot to receive bolts 45 extending into perforations in adjustable socket-pieces 12 or 13, the contacting faces of said bracket-plates and socket-pieces having like-shaped mating corrugations, to permit them to be secured together in a desired position of longitudinal adjustment. The socket-pieces 12 and 13 have projecting sockets 41 and 42 respectively, adapted to receive therein for lateral adjustment the inturned arms of the slideway 23. Set-screws 38 and 43 in the sockets 41 and 42 respectively serve to secure detachably said inturned arms in the desired lateral amount of adjustment in the sockets. By means of this lateral adjustment of the slideway 23, the idler 20 and forward part of the sprocket-chain 7 may be laterally adjusted for the same purpose for which the adjustment is provided for the rear end of the chain, to thereby allow of the chain to be adjusted in parallel to the receptacle. The slideway 23 is curved, preferably as an arc of a circle of which the axis of the shaft 3 is the center, to keep said chain 7 in equal tautness notwithstanding its position. A link 15 has its upper end pivoted at 19 to the slide-block 22, while its lower portion has a plurality of alined orifices adapted to afford an adjustment therealong of the pintle 16 projected from the end of the forward member of a bell-crank lever 37—36, the latter mounted to rock upon the lower inturned end of the slideway 23. To the rear member of said bell-crank lever 36 is pivoted at 30 the rear end of a connecting-rod 24, the forward end of which is pivoted at 25 to a medial orifice in the hand-lever 26, the latter pivoted at 27 to said receptacle 5. By means of this hand-lever the bell-crank may be rocked to cause the link 15 to raise or lower the sliding-block 22 along the slideway 23, and thus lift the idler 20 with the forward end of the chain 7 into or out of engagement with the driving-sprocket wheel 6.

It will be seen, that the above described means for adjusting the sprocket-chain 7, is so devised, that the forward end of the chain may be moved laterally in or out, and that the tension of the chain may be regulated by the shifting of the position forward, back or obliquely of the slideway, according to the positions in which the socket-pieces 12 and 13 are respectively placed upon the corrugated bracket-plates 39 and 40. The chain may thus be kept taut, notwithstanding its adjustment laterally or vertically.

Having described my invention, what I claim as new, and desire to secure by Letters Patent, is:

1. In combination, a receptacle, a distributing-drum at one end thereof mounted on a rotary shaft, one end of said shaft projecting from said drum, a perforated sleeve movable along said shaft and having an annular fillet on its outer end, a perforated collar on the inner end of said sleeve, a set-screw adapted to work through registering perforations in said collar and sleeve to engage said shaft, a driven sprocket-wheel rotatable upon said sleeve, yieldable resilient means between and engaging the fillet on said sleeve and the outer face of said sprocket-wheel, the adjacent faces of said collar and of the hub of said sprocket-wheel having like-shaped mating ratchet dentations intermeshed, a rotary driving-sprocket wheel, and a sprocket-chain operatively engaging both said driving- and driven-sprocket wheels.

2. In combination, a receptacle, a distributing-drum at one end thereof mounted on a rotary shaft, one end of said shaft projecting from said drum, a perforated sleeve movable along said shaft and having an annular fillet on its outer end, a perforated collar on the inner end of said sleeve, a set-screw adapted to work through registering perforations in said collar and sleeve to engage said shaft, a driven-sprocket wheel rotatable upon said sleeve, yieldable resilient means between and engaging the fillet on said sleeve and the outer face of said sprocket-wheel, the adjacent faces of said collar and of the hub of said sprocket-wheel having like-shaped mating ratchet dentations intermeshed, a rotary driving-sprocket wheel, a sprocket-chain operatively engaging both said driving- and driven-sprocket wheels, and means adapted to engage and disengage said sprocket-chain with and from said driving-sprocket wheel.

3. In combination, a receptacle, a distributing-drum at one end thereof mounted on a rotary shaft, one end of said shaft projecting from said drum and longitudinally grooved, a perforated sleeve movable along said grooved shaft and having an annular fillet on its outer end, a perforated collar mounted upon the inner end of said sleeve, a set-screw adapted to work through registering perforations in said collar and sleeve to engage the groove in said shaft, a driven-sprocket wheel rotatable upon said sleeve, yieldable resilient means between and engaging the fillet on said sleeve and the outer face of said sprocket-wheel, the adjacent faces of said collar and of the hub of said sprocket-wheel having like-shaped mating ratchet dentations intermeshed, a rotary driving-sprocket wheel, and a sprocket-chain operatively engaging both said driving- and driven-sprocket wheels.

4. In combination, a receptacle, a distributing-drum at one end thereof mounted on a rotary shaft, a driven-sprocket wheel secured to said shaft, a driving-sprocket wheel, a curved slideway spaced apart from said receptacle by inturned arms, with the hollow of its curve directed toward the driven-sprocket wheel, brackets on said receptacle to which the inturned arms of said slideway are slidingly connected for transversal adjustment, a slide movable along said slideway, an idler pivotally mounted in said slide, and a sprocket-chain about said idler and said driven-sprocket wheel and adapted to be operatively engaged with said driving-sprocket wheel when said slide is moved in a certain direction.

5. In combination, a receptacle, a distributing-drum at one end thereof mounted on a rotary shaft, a driven-sprocket wheel secured to said shaft, a driving-sprocket wheel, a curved slideway spaced apart from said receptacle by inturned arms, with the hollow of its curve directed toward the driven-sprocket wheel, slotted brackets on said receptacle, socket-pieces each adapted to receive one of the inturned arms of said slideway, means for securing said arms in the sockets of said pieces for transversal adjustment, the inner portions of said socket-pieces each being perforated, the contacting faces of said socket-pieces and of said brackets both having like-shaped mating corrugations, detachable fastening means in the slots of said brackets and the registering perforations of said socket-pieces adapted to secure them together for longitudinal adjustment, a slide movable along said slideway, an idler pivotally mounted in said slide, and a sprocket-chain about said idler and said driven-sprocket wheel, and adapted to be operatively engaged with said driving-sprocket wheel when said slide is moved in a certain direction.

6. In combination, a receptacle, a distributing-drum at one end thereof mounted on a rotary shaft, a driven-sprocket wheel secured to said shaft, a driving-sprocket wheel, a slideway spaced apart from said receptacle by inturned arms, brackets on said receptacle to which the inturned arms of said slideway are slidingly connected for transversal adjustment, a slide having mounted therein spaced apart anti-friction rollers located on each side of said slideway and adapted to roll therealong, an idler pivotally mounted in said slide, and a sprocket-chain about said idler and said driven-sprocket wheel and adapted to be operatively engaged with said driving-sprocket wheel when said slide is moved in a certain direction.

7. In combination, a receptacle, a distributing-drum at one end thereof mounted on a rotary shaft, a driven-sprocket wheel secured upon said shaft, a driving-sprocket wheel, a slideway spaced away from said receptacle by inturned arms, brackets on said receptacle to which the inturned arms of said slideway are slidingly connected for transversal adjustment, a slide movable along said slideway, a bell-crank lever fulcrumed on one of the inturned arms of said slideway, a link pivoted to said slide and having an adjustable connection with one of the arms of said bell-crank lever, a hand-lever pivoted to said receptacle, a connecting-rod between the other arm of said bell-crank lever and said hand-lever, an idler pivotally mounted in said slide, and a sprocket-chain about said idler and said driven-sprocket wheel and adapted to be operatively engaged with said driving sprocket wheel when said slide is moved in a certain direction.

Signed at Waterloo, Iowa, this 7th day of July, 1909.

CLINTON C. BUTLER.

Witnesses:
G. C. KENNEDY,
O. D. YOUNG.